Dec. 31, 1929.    A. B. CAMDEN    1,741,359
INSECT DESTROYING MACHINE
Filed Oct. 23, 1928    4 Sheets-Sheet 2

Inventor
A. B. Camden
By Watson E. Coleman
Attorney

Dec. 31, 1929.                    A. B. CAMDEN                    1,741,359
                           INSECT DESTROYING MACHINE
                     Filed Oct. 23, 1928        4 Sheets-Sheet 3
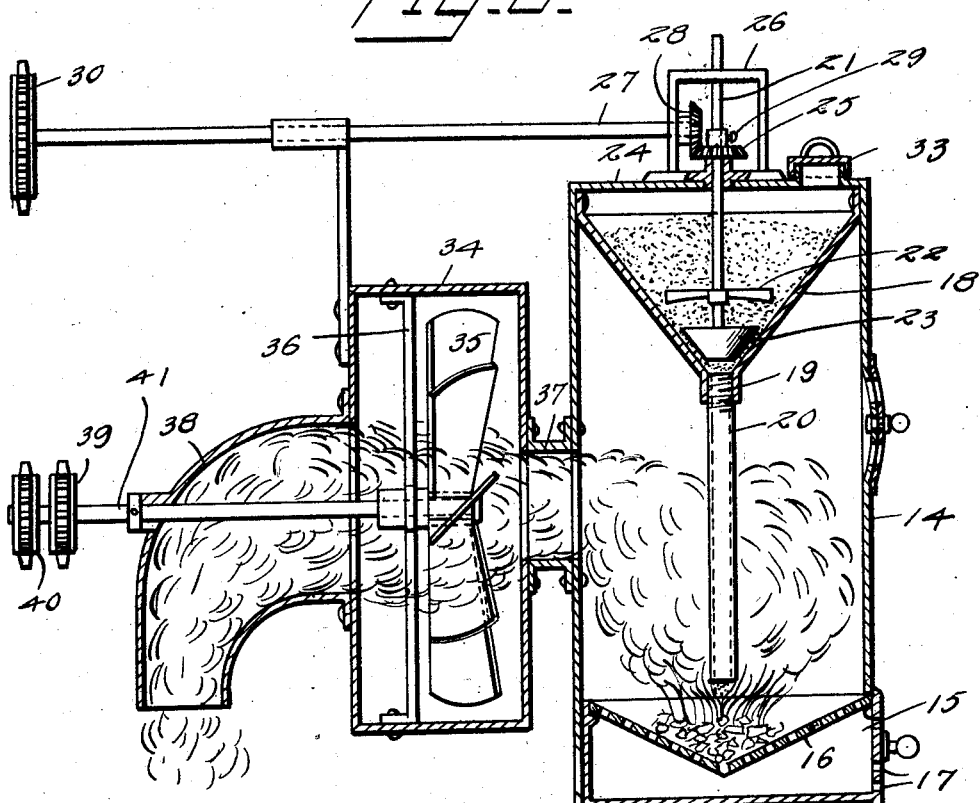
Inventor
A. B. Camden
By Watson E. Coleman
Attorney Dec. 31, 1929. A. B. CAMDEN 1,741,359
INSECT DESTROYING MACHINE
Filed Oct. 23, 1928  4 Sheets-Sheet 4
FIG-6-
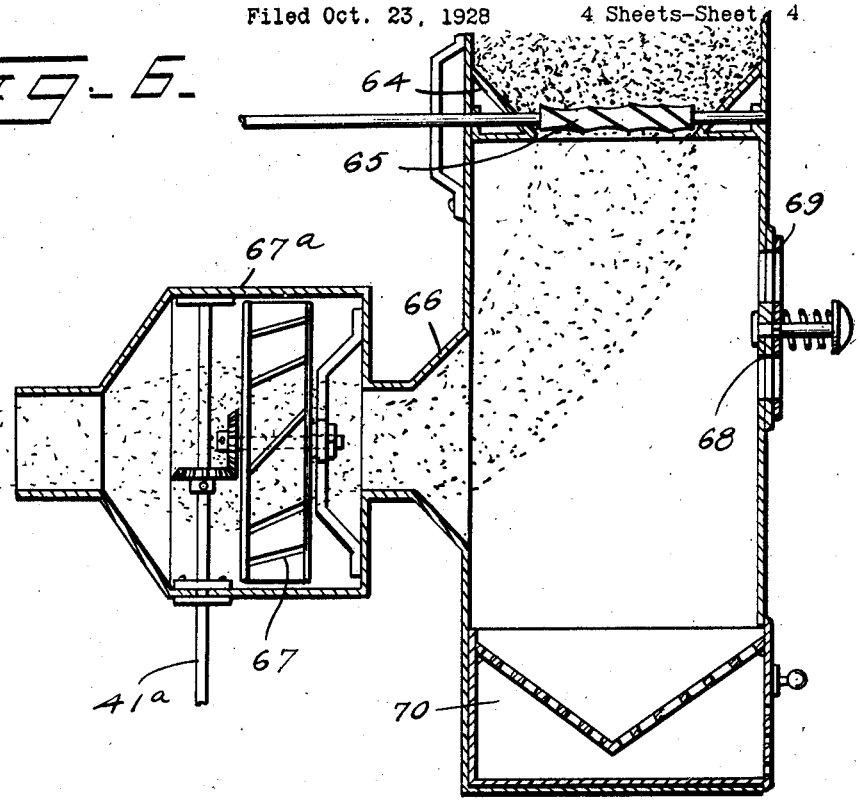
FIG-7-
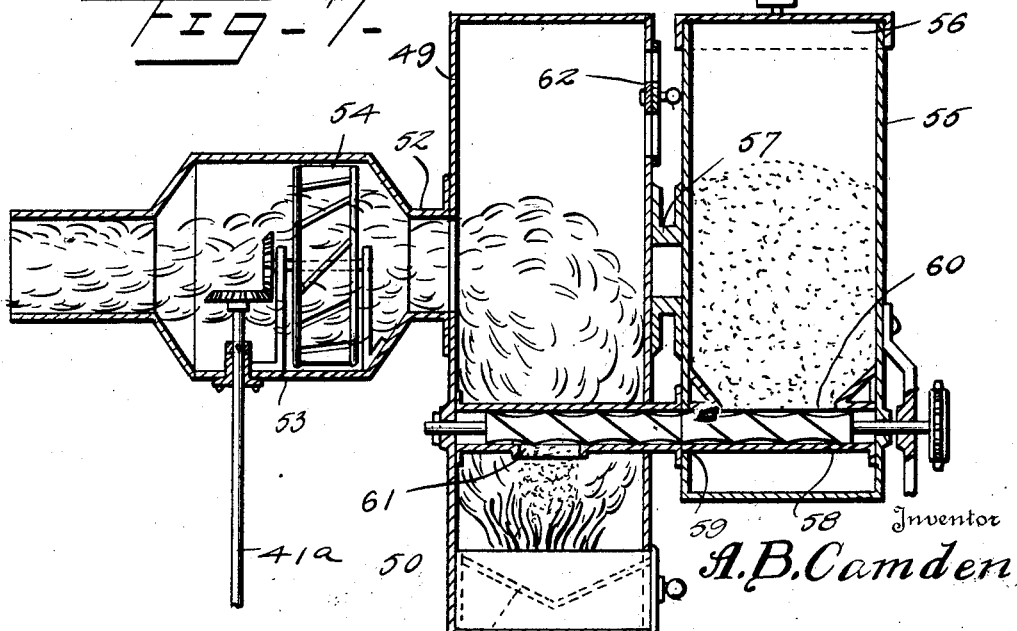
Inventor
A. B. Camden
By Watson E. Coleman
Attorney Patented Dec. 31, 1929

1,741,359

UNITED STATES PATENT OFFICE

ANDREW B. CAMDEN, OF DURANT, OKLAHOMA, ASSIGNOR OF ONE-HALF TO PORTER NEUMAN, OF DURANT, OKLAHOMA

INSECT-DESTROYING MACHINE

Application filed October 23, 1928. Serial No. 314,403.

This invention relates to machines for destroying insects on growing plants and particularly to machines of that character wherein powder or a poison smoke or spray is discharged onto the plants by a machine drawn along the rows of the plants.

The general object of the present invention is to provide improved means for discharging insect poisonous gas or smoke or discharging insect powder upon the plants, the machine including a fan discharging into a distributor pipe or pipes and a casing with which the fan is connected, the casing having means whereby smoke from a fire or poisonous vapors or fumes discharged from said fire may be drawn by the fan into the distributor and projected against the plants.

A further object is to so construct the distributing pipes that the poisonous powder, gas or smoke will be discharged all around the plants so as to touch the upper and under sides of the leaves and come in full contact with the stems.

Another object is to provide a structure of this character mounted upon wheels provided with distributor pipes which will distribute poisonous material either to one or more rows of plants and which is provided with a shield or hood of such length and form as to prevent the escape of insects from the plants, while at the same time it confines the poisonous vapors or dust immediately around the plants and prevents this poisonous material from escaping and being inhaled by the driver of the vehicle.

Other objects will appear during the course of the following description.

My invention is illustrated in the accompanying drawings in which—

Fig. 4 is a top plan view of the hood;

Fig. 5 is an enlarged fragmentary sectional view through one of the distributor pipes;

Fig. 6 is a vertical sectional view through another form of hopper, casing and fan;

Fig. 7 is a like view to Fig. 6 showing another modification of these parts; and Fig. 8 is a rear elevation of a three-row distributor.

Figure 1:
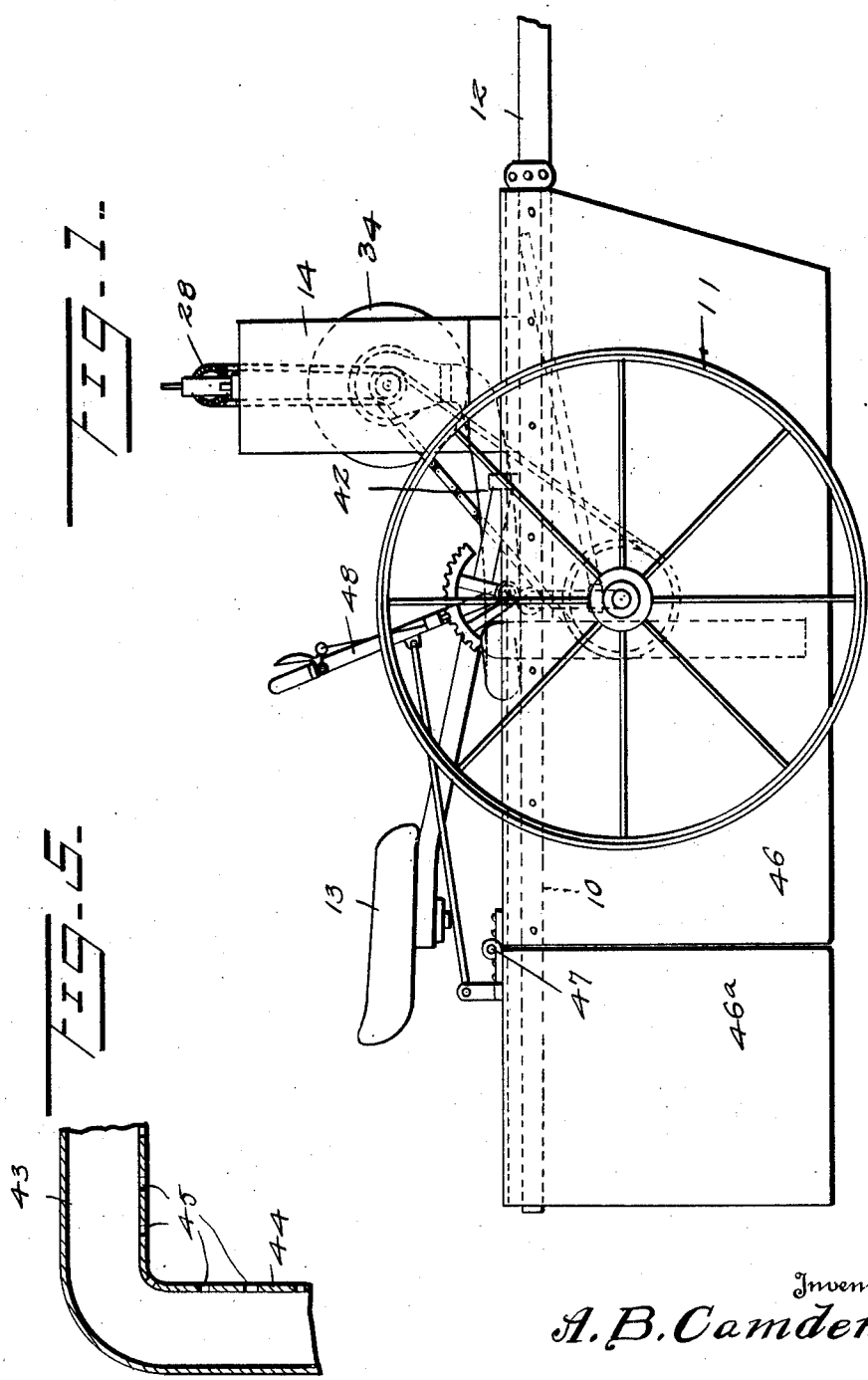
Fig. 1 is a side elevation of my insect destroyer.

Referring to the construction shown in Figs. 1 to 4, 10 designates part of the supporting frame of the machine. This supporting frame is mounted upon the wheels 11 and is provided with a draft tongue 12 and the seat 13. This supporting frame 10 extends rearwardly a distance of approximately eight feet for the support of a hood as will be later stated.

Mounted upon the supporting frame is a vertically disposed casing 14 which may be made of metal or any other suitable material and may be either round or square in cross section. Disposed within the lower end of this casing and forming the lower end thereof is a drawer 15 having a grate 16 therein of any desired form and a draft opening 17 controlled by any desired damper. This drawer 15 constitutes with the grate, a fire box so that a fire may be supported upon the grate. Disposed in the upper portion of the casing 14 is a hopper 18 designed to contain poison in a finely divided form. The lower end of this hopper has a screw-threaded portion 19, and a feeding tube 20 may be screwed at its upper end upon this portion 10 so as to discharge the powder from the hopper 18 onto the middle of the fire bed built upon said grate 16. For the purpose of agitating the powder within the hopper and keeping it stirred up and at the same time for controlling the amount of powder to be discharged through the tube 20 I provide a vertical shaft 21 which extends through the top of the hopper and which carries an agitator 22 adjacent its lower end. At its extreme lower end the shaft is preferably provided with a conical valve 23 designed to more or less restrict the effective area of the lower end of the hopper at its discharge mouth. The shaft 21 extends up through a suitable bearing in the top 24 of the hopper and passes loosely through the hub of a beveled gear wheel 25 which is contained within a gear casing 26.

Extending laterally through this gear casing is a driving shaft 27 carrying a beveled gear wheel 28 meshing with the gear wheel 25. The gear wheel 25 is adjustably engaged with the shaft 21 by means of a set screw 29, thus the shaft 21 may be shifted vertically to any desired position and then clamped in place to thus control the distance between the valve 23 and the bottom of the hopper and thus control the amount of poison powder discharged from the hopper. The shaft 27 carries the sprocket wheel 30 and this is driven from one of the wheels of the machine by means of a sprocket chain 31 driven by a sprocket wheel 32 mounted upon one of the wheels 11 or upon the rotatable axle thereof. The top 24 of the hopper is provided with a closure 33 through which the hopper may be filled when necessary.

Disposed adjacent to the casing 14 is a fan casing 34 within which is disposed an exhaust fan 35 which is supported upon a spider or frame 36. The casing 34 at its center is connected to the casing 14 by the duct 37. The opposite side of the casing is provided with a curved pipe or nozzle 38 which in turn is connected to distributor pipes as will be later stated. The fan may be driven in any suitable manner, but I have illustrated it as being driven by a sprocket wheel 39 mounted upon the fan shaft 41 and engaging the sprocket wheel 32. This shaft 41 also carries upon it the sprocket wheel 40 whereby the sprocket wheel 30 is driven.

Figure 2:
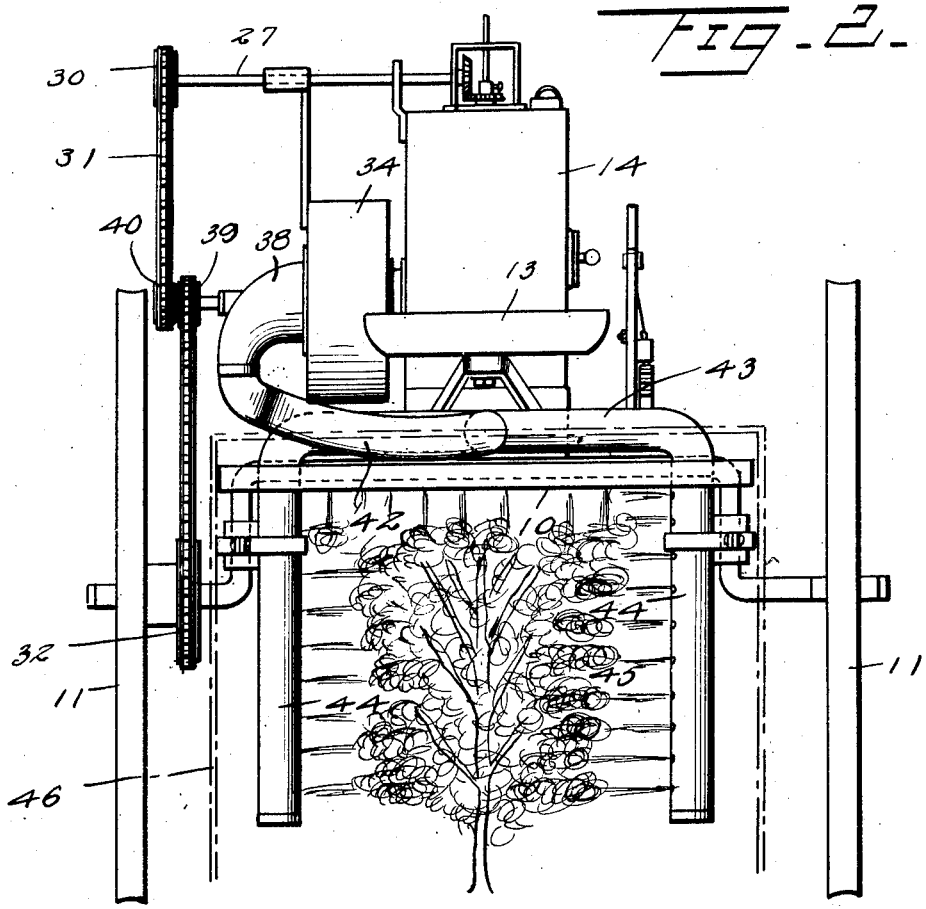
Fig. 2 is a rear elevation thereof.

Connecting the nozzle 38 of the fan housing 34 with the distributor is a pipe 42 opening into a longitudinal pipe 43 having, as illustrated in Fig. 2, two downwardly extending branches 44. In Fig. 8, however, I have illustrated the machine having four downwardly extending branches 44. The branches 44 and the longitudinally extending pipe 43 are perforated at 45, see Fig. 5, the perforations in the pipe 45 being between each pair of branches so that as the machine travels along the row the poisonous materials, whether powder, smoke or fumes, will be discharged downward onto the plants and toward the row of plants on both sides and the jets or streams of this poisonous material will meet on a line immediately adjacent the plant and a whirling motion will be set up which will cause this smoke, spray, or gas to eddy and whirl around the plant and the leaves thereof so that every portion of the plant will be treated. The construction shown in Fig. 2 is capable of only treating one row of the plants at a time, while that shown in Fig. 8 is capable of treating three rows. It will be understood, of course, that pipes 44 may be any desired distance apart.

Mounted upon the frame of the machine and extending rearward any desired distance is a hood 46 of sheet metal which is U-shaped in cross section so that it is open at front and rear, the rear end of the hood being somewhat contracted laterally and forming a rear section $46^a$ which is hinged as at 47 so that it may be raised up by means of a lever 48 having operative connections extending to to the rear section of the hood.

This hood not only confines the smoke or poisonous material immediately around the plants for an appreciable time while the hood is traveling over any particular plant, but also acts to prevent the escape of any of the insects from the poisonous atomizer and prevents the weakening of this atomizer during the time that the hood is passing over the plant, so that the insects are given the full benefit of the poison. It also prevents the driver from being affected by the poisonous fumes which would otherwise be likely to rise directly upward toward the driver.

In Fig. 7, I have illustrated a form of my invention wherein only gas or smoke is used, the smoke or gases arising from the burning fuel in the fire box being rendered poisonous by the discharge of poisonous particles onto the fire. In Fig. 7, I have not illustrated the wheeled supporting frame, the distributor pipes, etc., as these will be the same in all forms of my invention, but I have illustrated merely the fire casing with its box which is provided of course with the usual air inlet below the grate as in Figure 6, this not being shown in Figure 7 and means for feeding poisonous material in powdered form onto the fire and the exhaust fan. Referring to this figure, 49 designates a metallic casting having a fire box 50 at the lower end thereof in the form of a drawer, the fire box having a grate 51 heretofore referred to and having suitable draft openings. This casing 49 is connected by a duct 52 to the exhaust fan housing 53 wherein is disposed the exhaust fan 54 driven by gearing in any suitable manner, the housing having means whereby it may be connected to the distributor pipes.

Disposed to one side of the casing 49 is a hopper or magazine 55 having a detachable cover 56. The casing 55 is shown as being supported by a bracket 57 on the casing 49. Extending through the magazine or hopper 55 and through the casing 49 is a circular tube 58 having therein a worm screw 59 constituting a conveyor. The tube 58 has an elongated opening 60 through which powder in the magazine 55 may be discharged in the worm and the tube 58 above the fire which is provided with an opening 61 whereby the worm will discharge the powder onto the fire bed, thus creating a poisonous smoke or poisonous fumes which will be drawn outward by the exhaust fan and be discharged through the distributor onto the plant. The worm is driven by any suitable gear such for instance as a sprocket wheel, bevel gear wheel, or the like, operatively engaged for instance with the sprocket wheel on the supporting wheel axle. The casing 49 is provided with an air inlet 62 preferably in the form of a damper, this inlet being disposed above the bracket 57 and above the duct 52 so that the air will be drawn downward and toward the duct 52 by the action of the exhaust fan.

It will be obvious that with this construction the poisonous material within the hopper 55 is discharged upon the fire, thus creating a very thick smoke or dense and poisonous fumes or vapors which are drawn off by the exhaust fan and discharged through the distributor pipes and onto the plant.

In Fig. 6, I have illustrated another modification designed merely for the purpose of discharging powder onto the plants. The casing 63 has in its upper end a hopper 64 the bottom of which has a feed opening and extending along this feed opening is a worm or feed screw 65 driven in any suitable manner. The hopper is designed to hold poisonous powder. One side wall of the casing 63 is formed with a duct 66 leading into a fan housing 67a and the opposite side wall slightly above the duct 66 is provided with air intake openings 68 controlled by a draft damper 69. A drawer 70 is inserted in the lower end of the casing, this drawer being provided with a grate and acting as the fire box and having, of course, suitable draft openings. The fan housing contains the exhaust fan 67 driven by such means as has heretofore been described and the reduced extremity of the fan housing is connected to the distributor pipe in the manner heretofore described.

Figure 3:
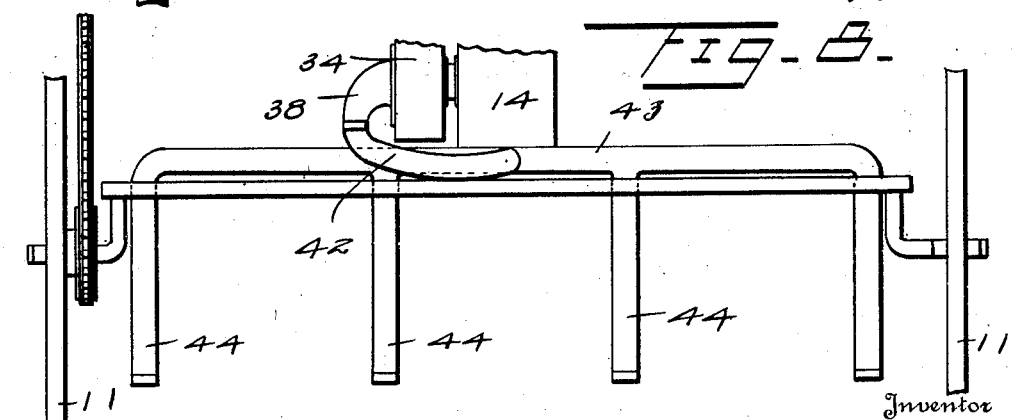
Fig. 3 is a vertical section through the fan casing of the hopper and its casing; and the fire box.

It is obvious that the construction shown in Fig. 3 may be used either to discharge powder alone by removing the tube 20 and opening the draft damper at the side of the casing or by using the tube 20 the powder may be discharged onto the fire to thus create a poisonous smoke.

Obviously, the construction shown in Fig. 7 is not suited for the discharge of powder only, while that in Fig. 6 may be used either for discharging powder or discharging smoke generated by powder dropping upon the flames and in all forms of this invention the poison, be it smoke or poisonous fumes or powder is applied to plants with considerable air force.

This air force thereby reaches every part of the plant making it impossible for an insect to escape if it is on the plant or caught beneath the hood of the machine and it will be seen from Fig. 2 that the smoke or powder is discharged from the distributor pipes under pressure and that the jets come from the top and both sides meet in the middle of a row of plants and break up in every direction. This causes a whirling or eddying motion of the smoke or powder so that every part of the plant is reached by the poisonous material.

It will be seen that in Figs. 6 and 7 I have illustrated a different method of driving the exhaust fan 54 or 67 and have shown, for instance, the shaft 41$^a$ disposed at right angles to the axis of the fan and engaged therewith by beveled gear wheels which are preferably housed, but are not so shown for the sake of clearness.

It is obvious that many changes may be made in the minor details of construction and the arrangement of parts without departing from the spirit of the invention as defined in the appended claims.

What I claim is:

1. An insect destroyer including a wheeled frame, a fan housing thereon, perforated distributors connected to the fan housing, an exhaust fan in the housing discharging to the distributors, a casing communicating with the fan housing behind the fan, and means operatively driven from the wheels of the frame positively and continuously discharging poison at a predetermined rate and in a finely divided condition into said casing from which it is drawn by the exhaust fan.

2. An insect destroyer including a wheeled frame, a fan housing thereon, perforated distributors connected to the fan housing, an exhaust fan in the housing discharging into the distributors, a casing communicating with the fan housing behind the fan and having an air inlet, and means for controlling passage of air therethrough, a fire box forming the lower end of said casing, a poison containing hopper, and means for discharging poison continuously in small quantities from said hopper into said casing above the fire box thereof.

3. An insect destroyer including a wheeled frame, a fan housing thereon, perforated distributors connected to the fan housing, an exhaust fan in the housing discharging into the distributors, a casing communicating with the fan housing behind the fan and having an air inlet, and means for controlling passage of air therethrough, a fire box forming the lower end of said casing, a poison containing hopper, and means for discharging poison continuously in small quantities onto the fire in said fire box whereby to generate poisonous fumes, the fumes being withdrawn from the casing by the exhaust fan.

4. An insect destroyer including a wheeled frame, a fan housing thereon, perforated distributors connected to the fan housing, an exhaust fan within the housing, means driven from the wheels of the frame for driving said fan, a casing communicating with the interior of the fan housing behind the fan, a drawer in the lower portion of said casing constituting a fire box and having a grate, and means for admitting air beneath the grate, a poison container and means for feeding small portions of the poison continuously onto the grate to thereby generate the poisonous fumes, and means for driving said feeding means from the wheels of the machine.

5. An insect destroyer including a wheeled supporting frame, a fan housing mounted thereon, perforated distributors connected therewith, an exhaust fan within the housing discharging into the distributors, means for driving said fan, a casing associated with the fan housing and open thereinto behind the fan, a drawer forming the lower end of the casing and having therein a grate, and means for supplying air to a fire on said grate, a poison hopper disposed in the upper portion of said casing, the casing below the poison hopper having a regulatable air inlet, and means for feeding the poison continuously from said hopper into the casing, said means being driven from the wheels of the supporting frame.

In testimony whereof I hereunto affix my signature.

ANDREW B. CAMDEN.